US011364713B2

(12) United States Patent
Schillings

(10) Patent No.: US 11,364,713 B2
(45) Date of Patent: Jun. 21, 2022

(54) COMPOSITE FOR THE PRODUCTION OF FILMLESS LAMINATES

(71) Applicant: Dimension-Polyant GmbH, Kempen (DE)

(72) Inventor: Heiner Schillings, Heinsberg (DE)

(73) Assignee: Dimension-Polyant GmbH, Kempen (DE)

( * ) Notice: Subject to any disclaimer, the term of this patent is extended or adjusted under 35 U.S.C. 154(b) by 241 days.

(21) Appl. No.: 16/481,874

(22) PCT Filed: Feb. 2, 2018

(86) PCT No.: PCT/EP2018/052637
§ 371 (c)(1),
(2) Date: Jul. 30, 2019

(87) PCT Pub. No.: WO2018/141899
PCT Pub. Date: Aug. 9, 2018

(65) Prior Publication Data
US 2020/0039194 A1 Feb. 6, 2020

(30) Foreign Application Priority Data

Feb. 3, 2017 (DE) .......................... 102017102158.2

(51) Int. Cl.
| *B32B 27/12* | (2006.01) |
| *C09J 7/21* | (2018.01) |
| *B32B 5/02* | (2006.01) |
| *B32B 7/12* | (2006.01) |
| *B32B 27/26* | (2006.01) |
| *B32B 27/34* | (2006.01) |
| *B32B 27/40* | (2006.01) |
| *D06M 15/564* | (2006.01) |
| *D06M 15/59* | (2006.01) |

(52) U.S. Cl.
CPC .............. *B32B 27/12* (2013.01); *B32B 5/022* (2013.01); *B32B 7/12* (2013.01); *B32B 27/26* (2013.01); *B32B 27/34* (2013.01); *B32B 27/40* (2013.01); *C09J 7/21* (2018.01); *D06M 15/564* (2013.01); *D06M 15/59* (2013.01); *B32B 2250/02* (2013.01); *B32B 2255/02* (2013.01); *B32B 2260/021* (2013.01); *B32B 2307/72* (2013.01); *B32B 2307/732* (2013.01); *C09J 2203/00* (2013.01)

(58) Field of Classification Search
CPC ......... B32B 27/12; B32B 27/34; B32B 27/40; B32B 27/26; B32B 5/022; B32B 7/12; B32B 2255/02; B32B 2260/021; B32B 2250/02; B32B 2307/72; B32B 2307/732
See application file for complete search history.

(56) References Cited

U.S. PATENT DOCUMENTS

| 3,900,625 | A | * | 8/1975 | Chen ...................... B32B 27/12 428/110 |
| 5,460,884 | A | * | 10/1995 | Kobylivker ............... D01F 6/46 428/373 |
| 5,770,530 | A | * | 6/1998 | Nockemann ............ B32B 5/022 442/319 |
| 2004/0007324 | A1 | * | 1/2004 | Henn ....................... B32B 7/12 156/327 |
| 2004/0058603 | A1 | * | 3/2004 | Hayes ...................... B32B 27/12 442/286 |
| 2006/0252329 | A1 | * | 11/2006 | Nahmias ................. B32B 27/12 442/286 |
| 2011/0281100 | A1 | | 11/2011 | Skankey et al. |

FOREIGN PATENT DOCUMENTS

WO 0189831 A1 11/2001

OTHER PUBLICATIONS

International Search Report & Translation Application No. PCT/EP2018052637 Completed: Apr. 11, 2018; dated Apr. 18, 2018 5 Pages.
Written Opinion of the International Searching Authority & Translation Application No. PCT/EP2018/052637 dated Apr. 18, 2018 7 Pages.

* cited by examiner

*Primary Examiner* — Jeremy R Pierce
(74) *Attorney, Agent, or Firm* — Whitmyer IP Group LLC

(57) ABSTRACT

A composite for the production of filmless sailcloth laminates with an adhesive film and a textile layer including: a thermoplastic plastic film as adhesive film containing a thermally activatable crosslinking agent dispersed therein, as carrier, and a textile layer which is adhesively bonded to the thermoplastic plastic film; wherein the plastic film and the textile layer are adhesively bonded together by the effect of heat at a first temperature which does not activate the crosslinking agent, and the composite is bondable to a substrate by the effect of heat at a second temperature which is higher than the first temperature and causes crosslinking to take place.

19 Claims, No Drawings

COMPOSITE FOR THE PRODUCTION OF FILMLESS LAMINATES

TECHNICAL FIELD

The invention relates to a composite for the production of filmless laminates by means of a thermoplastic film of plastic material and a textile layer. The thermoplastic plastic film serves as a carrier and contains dispersed therein a crosslinking agent capable of being activated thermally. The textile layer is adhesively bonded to the thermoplastic plastic film by a thermal treatment. In particular, the composite is suitable for the production of filmless laminates for sport sailing purposes.

BACKGROUND

Plastic films are frequently employed to improve the properties of area-measured/sheet materials. They improve, for example, the breaking and tearing resistance, prevent the propagation of cracks, increase impact strength and enhance the visual appearance.

Reinforcing fibers are used in packaging materials and engineered products to increase tensile strength, impact strength, stiffness and processing compatibility. In combination with plastic films, improvements are achieved that result from the combination of the properties of both materials. A composite of plastic films and reinforcing fibers has proven itself for sports sailing purposes.

For the manufacture of high-duty sans it is an essential requirement to combine quite a number of special characteristics such as low weight, good handling qualities, low permeability to wind, high tearing resistance, elasticity, and similar properties. For that reason, it is the goal of every sailcloth maker to optimize all these properties in just one cloth membrane for sail manufacturing.

Plastic films coated with thermoplastic adhesives or two-component adhesives are nowadays used for the production of laminates intended for sailing sports. Reinforcing yarns are introduced into the adhesive bed in different ways and then bonded together under the influence of heat. Depending on the application of the cloth, a bonded textile layer that serves to protect the film and the laminate is arranged on the side opposite the adhesive bed. In this context, a structure commonly employed is therefore the sequence of outer layer/adhesive/film/adhesive/reinforcement/adhesive/film/adhesive/outer layer.

Thermoplastic plastic films for the production of laminates are known. In this context, WO 01/89831 A1 describes a method for the production of multilayer document cards as well as document cards made in accordance with this method, in which plastic films provided with a crosslinking agent are employed for bonding the layers. The crosslinking agent is activated by pressure and/or temperature and by crosslinking the plastic material causes the individual layers to be glued together. The method is used for the production of identity cards and bank cards.

SUMMARY

It is therefore the objective of the present invention to provide a means of producing multilayer laminate in a simple and efficient manner. In particular, the hitherto practiced method and way according to which the individual components are bonded in a production line is to be simplified by the elimination of plastic films.

This objective is achieved by means of a composite of the kind first mentioned above, in which the thermoplastic plastic film and the textile layer are adhesively bonded to each other by the effect of heat at a first temperature which does not activate the crosslinking agent, wherein the composite being bondable to a substrate by the effect of heat at a second temperature which is higher than the first temperature.

DETAILED DESCRIPTION

The composite proposed by the present invention comprises a thermoplastic plastic film as adhesive film and carrier film, which, dispersed therein, contains a thermally activatable crosslinking agent. This plastic film is adhesively bonded to the textile layer, i.e. glued together with it. This adhesive bonding is achieved by the application of heat at a first temperature which causes the film to soften and produce an adhesive effect without the film losing its thermoplastic properties. After fixation and attachment of the textile layer and after the film has cooled down, it no longer has an adhesive effect and can be stored indefinitely. In particular, the film retains its flexibility as well as thermoplastic properties which enables further coatings to be applied under the same conditions.

The composite claimed in accordance with the invention may be composed of further layers, such as a coating containing additives to improve the properties of the end product, for example UV absorbers, pigments or the like, generally referred to as stabilizing additives.

As a result of the crosslinking agent dispersed in the thermoplastic plastic film, said agent having an activation temperature (second temperature) and being thermally activated at this temperature, the composite proposed by the invention can be bonded again by heating to this second temperature, with the film obtaining thermosetting properties due to the activation of the crosslinking agent.

After the thermoplastic film has attached to the substrate by bonding, it fulfils the function of an adhesive bed in which the textile layer is usually laid. In this respect the laminates can be described as "filmless". Compared to the adhesive bed, the thermoplastic plastic film as a rule has a low weight per unit area.

The composite formed together with a substrate is a laminate that combines the properties of the substrate and the composite. In particular, area-measured textile materials serve as substrates, which are bonded to the inventive composite to form sailcloth/canvas. However, to form a laminate it is also possible to bond two layers of the corn posit proposed by the invention and internal reinforcing material. In this case, the laminate structure consists of outer layer/adhesive/reinforcement/adhesive/outer layer.

Another advantage of crosslinking is that, for example, reinforcing fibers are firmly integrated and embedded in the composite, which greatly reduces the tendency of the fiber reinforcement to slip.

By the term substrate area-measured materials and surfaces shall be understood that can he bonded to the composite proposed by the invention, for example sailcloth. However, the inventive composite can also be employed for any other purpose, for example for tarpaulins that must have a high tear strength, for packaging films, for roofing films/sheeting as well as protective covers.

Suitable plastic films, which contain a thermally activated crosslinking agent dispersed therein, are described for example in publication WO 01/89831 A1, the disclosure content of which shall be expressly included here. Preferred plastic films are those which are obtainable from thermoplastic plastic materials with double bonds, retain at least one double bond and contain a peroxide as crosslinking component. Particularly preferred plastic materials are unsaturated polyamides and polyurethanes. Unsaturated polyesters can also be a possible option.

The first temperature at which the adhesive effect of the plastic film sets in is preferably less than 80° C. and in particular ranges between 60° and 70° C. At this temperature, the plastic material retains its thermoplastic properties, but is capable of adhering to layers of textile material applied to it. After returning to room temperature, the laminate is in effect tack-free and can be further processed like a normal plastic film.

At the second activation temperature, which is above 80° C. and preferably ranges between 110° and 130° C., the crosslinking agent is activated and crosslinks the plastic material to form a thermosetting plastic. If the composite at this temperature is located on a substrate or in between two layers or on another layer of the composite, an irreversible bonding takes place, which also results in the reinforcing fibers to be more firmly integrated. A laminate produced in this way can be delaminated only with greatest difficulty and additionally gains a higher stiffness due to the conversion of the plastic film into a thermoset.

As crosslinking agents, the ones referred to in publication WO 01/89831 A1 are particularly appropriate, for example the following agents with the activation temperature given in brackets:
- methyl ethyl ketone peroxide (~80° C.)
- dibenzoyl peroxide (~100° C.)
- di-tert-butyl peroxide (~150° C.)
- tert-butyl peroxybenzoate (~130° C.).

According to another variant of the invention, the thermoplastic Mastic film contains aside from a thermoplastic resin component containing reactive hydrogen also a polyisocyanate component reactive therewith. In this variant the thermoplastic plastic film utilizes the reactivity of the isocyanate component for the crosslinking of the adhesive layer at the second temperature. Upon activation of the system, the isocyanate groups of the polyisocyanate component are available as reaction partners for crosslinking purposes. These are, in particular, hydroxyl groups and amino groups of the resin component. However, the reaction between the two components does not yet take place at room temperature but only above the activation temperature which is reached during the application of the composite to a substrate.

Common polyisocyanate components can be employed, in particular those based on hexamethylene diisocyanate, toluene diisocyanate, and diphenylmethane diisocyanate.

In this case, the polyisocyanate may be present in the form of a monomer or as a prepolymer, i.e. partially crosslinked with the aid of a customary crosslinking agent. In order to prevent the premature reaction of the adhesive system already at room temperature, it is advisable to either block or encapsulate the polyisocyanate component. In the event of a chemical blocking approach using conventional blocking agents, the blocking agent is split off again above the unblocking temperature resulting in the reactivity of the isocyanate groups being restored. By selecting the appropriate blocking agent, the blocking temperature can be adjusted. Moreover, the deblocking temperature can be lowered through the use of catalysts. The following blocking agents may be employed:
- phenol (140° to 180° C.)
- ε-caprolactam (160° to 180° C.)
- butanonoxim (135° to 155° C.)
- malonic acid ester (100° to 130° C.).

Another possible blocking method is the dimerization of the isocyanate groups to urethdione.

In the case of microencapsulation, the encapsulation is eliminated when the activation temperature (second temperature) is reached the polyisocyanate is released and reacts with the reactive resin component with crosslinking taking place.

As resin component and reactant for the polyisocyanates, forms of polyols and higher molecular-weight thermoplastic polyamines may in particular be used, for example polyetherols, polyesterols, OH functional poly(meth)acrylates and -urethanes or $NH_2$-functional polyamides.

The thermoplastic plastic film used in accordance with the invention usually has a thickness of 0.01 to 0.07 mm, in particular of 0.025 to 0.05 mm. The film weight per unit area corresponds approximately to the weight per unit area of a customary adhesive bed used for bonding substrates with films and reinforcing fibers.

Within the meaning of the invention, a textile layer can be a non-woven fabric, a taffeta fabric and/or a scrim fabric consisting of monofilament or multifilament yarns.

Preferred are light non-woven fabrics and taffeta fabrics having a weight per unit area of up to 50 $g/m^2$.

The reinforcing fibers used are customary fibers, such as those most commonly employed in sport sailing, such as aramid, carbon, polyolefin and/or polyester fibers. Moreover, a fiber reinforcement may also be applied to the thermoplastic plastic film in the form of a non-woven fabric, with the fibers of said non-woven fabric may run or extend unidirectionally or multidirectionally.

The ultimately desired mechanical properties such as tensile strength, force-stretch behavior, etc. are achieved by the reinforcing materials that have been integrated in the laminate. This is brought about in the known manner such as by inserting scrims, inserting so-called insert yarns in the machine direction, inserting reinforcing fibers crossing each other at an angle or, in the case of so-called load-path laminates, by arranging the reinforcing fibers along the calculated load lines. The reinforcing fibers used are customary fibers, such as those most commonly employed in sport sailing, such as aramid, carbon, polyolefin and/or polyester fibers.

The weight per unit area of the composite proposed by the invention generally ranges between 20 and 100 $g/m^2$. Especially preferred is a weight per unit area of between 30 and 50 $g/m^2$.

The inventive composite can be easily produced in great lengths and may be manufactured, for example, as roll material with widths up to 2.0 m and lengths of up to 1,000 m. The roll material can be cut to size as required and may also be applied to curved surfaces due to the fact that the composite is highly flexible. The production of reinforcing tapes is also conceivable. In order to facilitate handling and to avoid adhesion during storage at elevated room temperatures, it may he useful to provide the inventive composite with one or two cover foils (transfer foils, release foils), which, particularly in the case of roll material, enables the layers to be reliably separated and the fiber reinforcement to be protected against damage.

The production of thermoplastic polyurethane with crosslinking agent integrated therein is known in prior-art. For example, reference shall also be made to publication WO 01/89831 A, which describes unsaturated polyurethanes that can be crosslinked with peroxides.

The invention claimed is:

1. A composite having an adhesive film and a textile layer for the production of laminates comprising:
   (a) a thermoplastic plastic film as adhesive film containing a thermally activatable crosslinking agent dispersed therein, as carrier, and
   (b) a textile layer which is thermally bonded to the thermoplastic plastic film;
   wherein the plastic film and the textile layer are thermally bonded together by the effect of heat at a first temperature which does not activate the crosslinking agent, and the composite is bondable to a substrate by the effect of heat at a second temperature which is higher than the first temperature and causes crosslinking to take place;
   wherein a weight per unit area of the composite ranges between 20 and 100 g/m$^2$.

2. The composite according to claim 1, wherein the first temperature is less than or equal to 80° C. and the second temperature is greater than 80° C.

3. The composite according to claim 1, wherein the thermoplastic plastic material of the adhesive film is an unsaturated polyamide or polyurethane and the crosslinking agent is a peroxide having an activation temperature>80° C.

4. The composite according to claim 3, wherein the thermoplastic plastic film is a polyurethane film which, after crosslinking, acquires thermosetting properties.

5. The composite according to claim 1, wherein the thickness of the plastic film ranges between 0.01 and 0.07 mm.

6. The composite according to claim 1, wherein the textile layer includes a taffeta fabric or a non-woven fabric.

7. The composite according to claim 1, wherein the textile layer contains reinforcing fibers.

8. The composite according to claim 7, wherein, the reinforcing fibers are arranged in two or more layers of parallel filaments, with the directions of the filaments intersecting with each other.

9. The composite according to claim 1, further comprising an adhesively bonded covering layer.

10. The composite according to claim 9, wherein the covering layer contains stability-enhancing additives.

11. The composite according to claim 1, further comprising at least one strippable cover foil.

12. The composite according to claim 1, in the form of rolls or tapes/bands.

13. The composite according to claim 2, wherein the thermoplastic plastic material of the adhesive film is an unsaturated polyamide or polyurethane and the crosslinking agent is a peroxide having an activation temperature>80° C.

14. The composite according to claim 1, wherein the thickness of the plastic film ranges between in particular between 0.025 and 0.05 mm.

15. The composite according to claim 2, wherein the textile layer includes a taffeta fabric or a non-woven fabric.

16. The composite according to claim 1, wherein the textile layer contains reinforcing fibers.

17. The composite according to claim 1, wherein a weight per unit area of the composite ranges between 30 and 50 g/m$^2$.

18. A reinforcement for films and textile area-measured/sheet materials made from:
   (a) a thermoplastic plastic film as adhesive film containing a thermally activatable crosslinking agent dispersed therein, as carrier, and
   (b) a textile layer which is thermally bonded to the thermoplastic plastic film;
   wherein the plastic film and the textile layer are thermally bonded together by the effect of heat at a first temperature which does not activate the crosslinking agent, and the composite is bondable to a substrate by the effect of heat at a second temperature which is higher than the first temperature and causes crosslinking to take place;
   wherein a weight per unit area of the composite ranges between 20 and 100 g/m$^2$.

19. Sailcloth and sails made from:
   (a) a thermoplastic plastic film as adhesive film containing a thermally activatable crosslinking agent dispersed therein, as carrier, and
   (b) a textile layer which is thermally bonded to the thermoplastic plastic film;
   wherein the plastic film and the textile layer are thermally bonded together by the effect of heat at a first temperature which does not activate the crosslinking agent, and the composite is bondable to a substrate by the effect of heat at a second temperature which is higher than the first temperature and causes crosslinking to take place;
   wherein a weight per unit area of the composite ranges between 20 and 100 g/m$^2$.

* * * * *